No. 665,782. Patented Jan. 8, 1901.
H. K. HESS.
PRIMARY BATTERY.
(Application filed Jan. 11, 1899.)
(No Model.) 4 Sheets—Sheet 1.

Witnesses:—
Frank L. A. Graham
Will. A. Barr

Inventor:—
Henry K. Hess
by his Attorneys
Howard Howson

No. 665,782. Patented Jan. 8, 1901.
H. K. HESS.
PRIMARY BATTERY.
(Application filed Jan. 11, 1899.)
(No Model.) 4 Sheets—Sheet 2.

Witnesses:
Frank L. A. Graham
Niu. A. Barr.

Inventor:—
Henry K. Hess
by his Attorneys

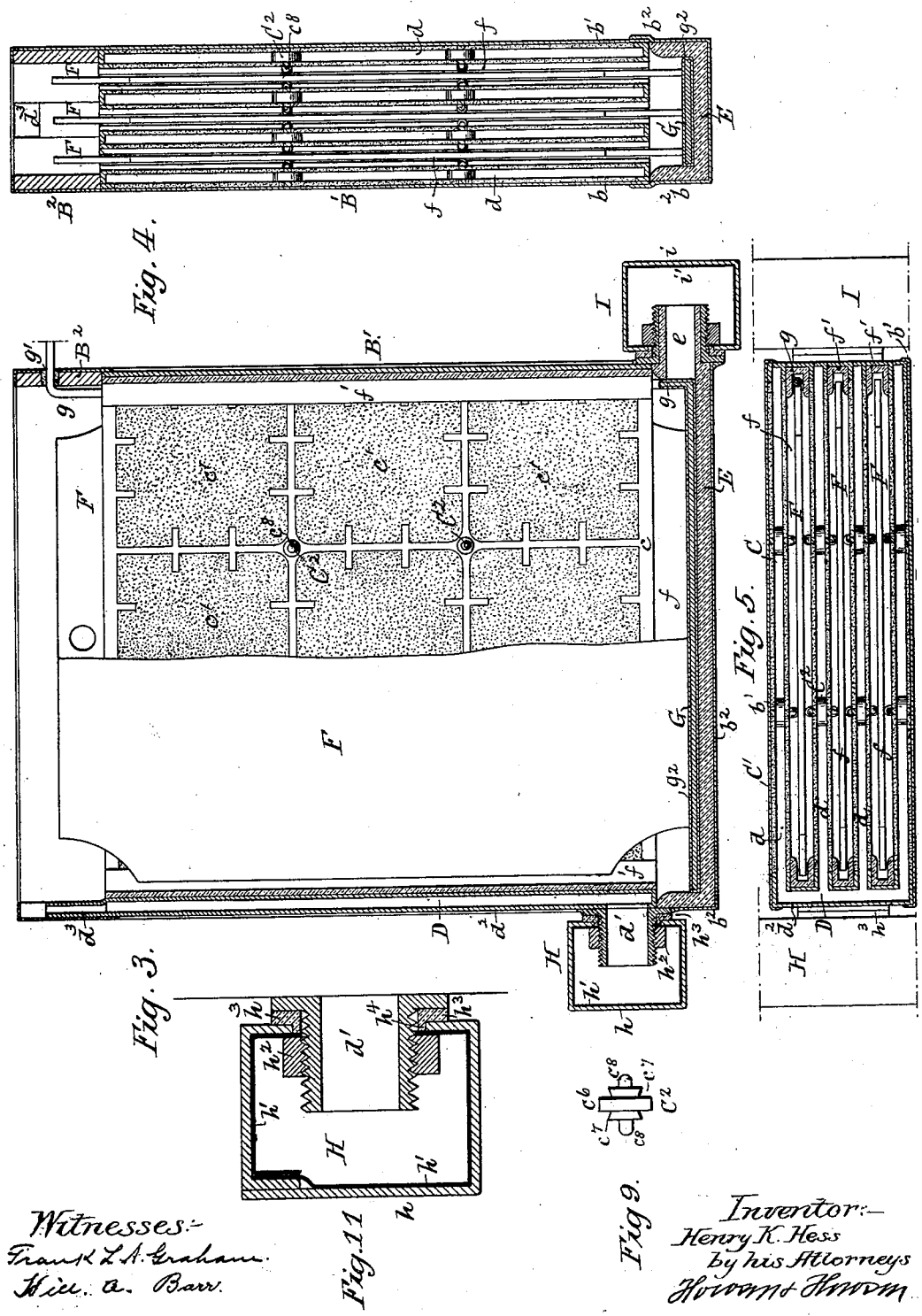

No. 665,782. Patented Jan. 8, 1901.
H. K. HESS.
PRIMARY BATTERY.
(Application filed Jan. 11, 1899.)
(No Model.) 4 Sheets—Sheet 4.
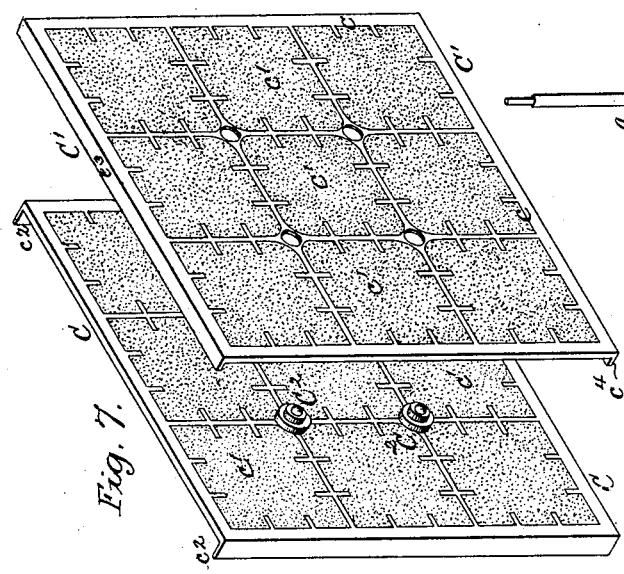
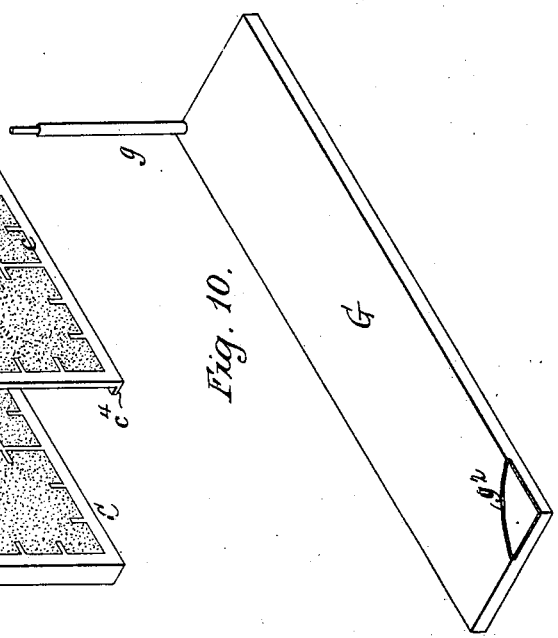
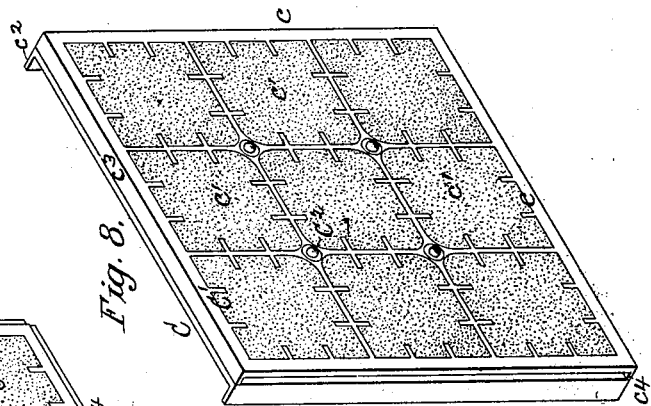
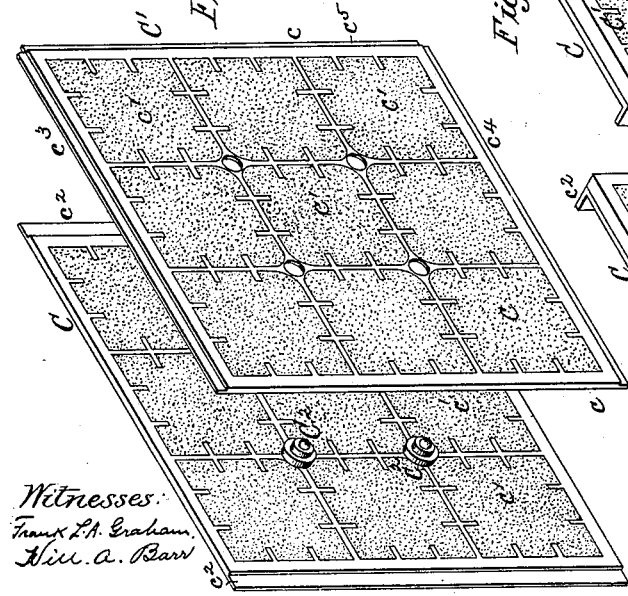
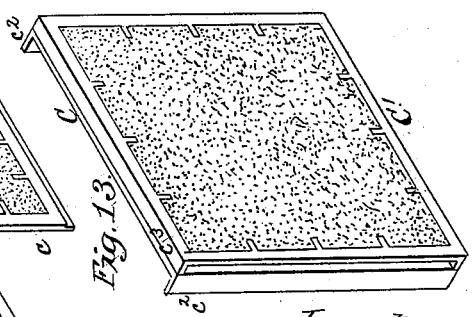
Witnesses:
Frank L. A. Graham
Wm. A. Barr
Inventor:—
Henry K. Hess,
by his Attorneys,
Howson & Howson

UNITED STATES PATENT OFFICE.

HENRY K. HESS, OF PHILADELPHIA, PENNSYLVANIA, ASSIGNOR TO HERMAN J. DERCUM, TRUSTEE, OF SAME PLACE.

PRIMARY BATTERY.

SPECIFICATION forming part of Letters Patent No. 665,782, dated January 8, 1901.

Application filed January 11, 1899. Serial No. 701,822. (No model.)

*To all whom it may concern:*

Be it known that I, HENRY K. HESS, a citizen of the United States, residing in Philadelphia, Pennsylvania, have invented certain Improvements in Primary Batteries, of which the following is a specification.

My invention relates to certain improvements in the primary battery for which United States Letters Patent were granted to me on November 29, 1898, No. 615,172.

The object of my present invention is to provide means for charging the compartments of the battery with the liquid, and to certain improvements in the details of construction.

Figure 1:
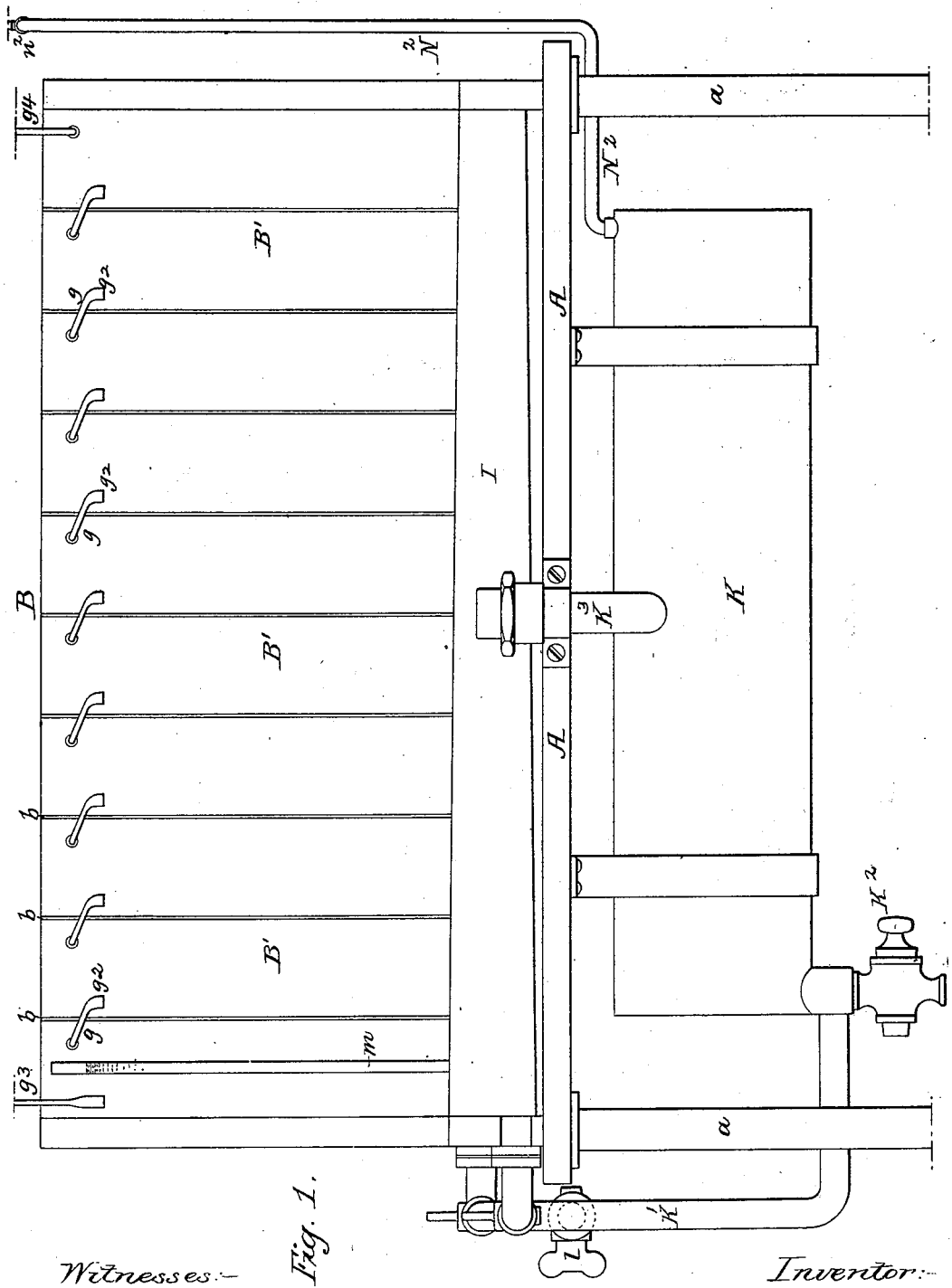
Figure 2:
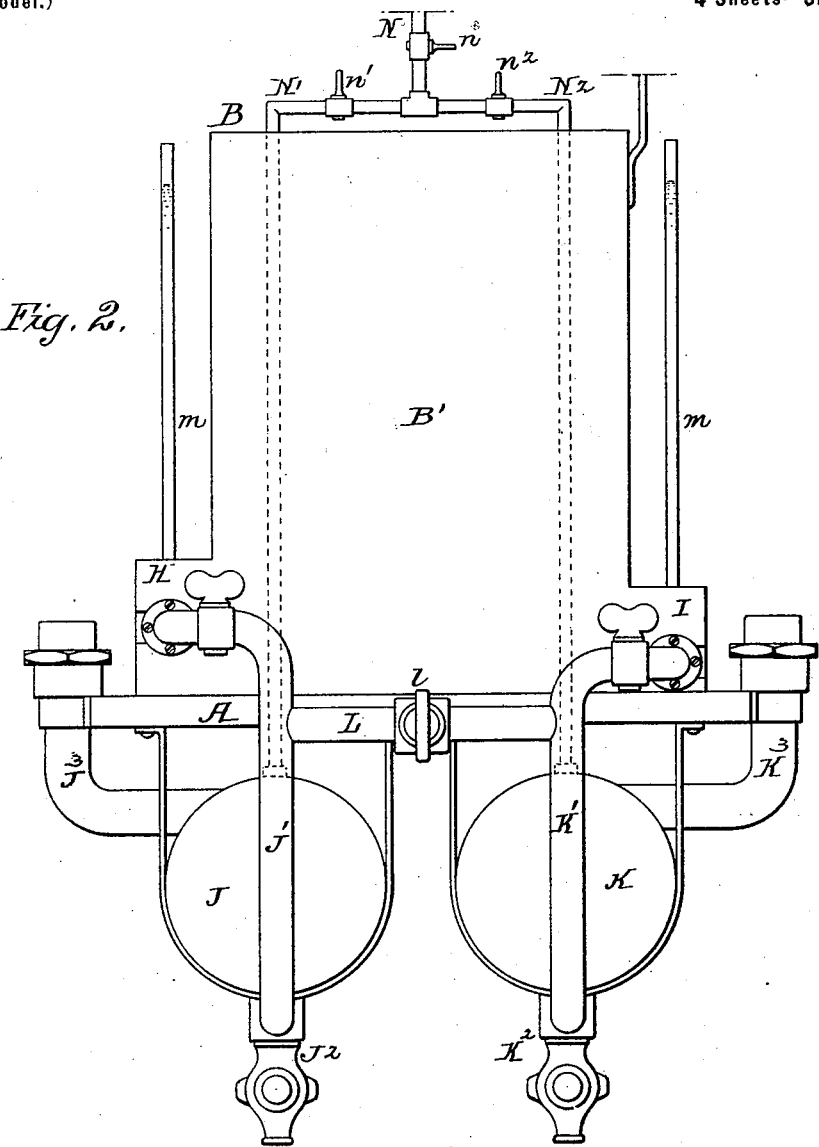
Figure 12:
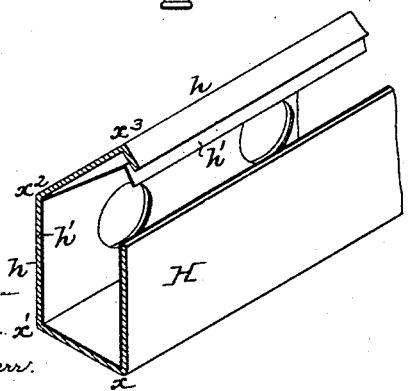

In the accompanying drawings, Figure 1 is a side view of my improved primary battery, showing a series of the battery-cells coupled with storage-tanks for the liquids. Fig. 2 is an end view of Fig. 1. Fig. 3 is a sectional view of one of the battery-cells. Fig. 4 is a vertical sectional view of one of the battery-cells. Fig. 5 is a sectional plan view of one of the battery-cells. Figs. 6, 7, and 8 are detached perspective views of the partition-plates. Fig. 9 is a view of one of the studs. Fig. 10 is a perspective view of the conducting-plate for the zinc electrode. Fig. 11 is an enlarged sectional view of one of the channels. Fig. 12 is a detached perspective view of one of the channels. Fig. 13 is a view showing the method of forming a single carbon plate.

A is a table mounted on suitable supports $a$ $a$ in the present instance, and on this table is mounted the primary battery B, in the present instance consisting of ten cells B′, separated by suitable non-conducting partitions $b$, preferably of asbestos.

I will first describe the detailed construction of the cells, reference being had to Figs. 3, 4, and 5.

Each cell B′ is made up of a series of partition-plates C C′, Figs. 6, 7, and 8. These plates in the present instance consist of a frame $c$, holding a series of carbon sections $c'$, the carbons having incisions in their edges, and the frame is cast around the assembled carbons, the molten metal passing into the incisions. In some instances, particularly in small cells, a single carbon plate may be used, as shown in Fig. 13, the lead frame $c$ surrounding the plate C and confined thereto by the metal when molten entering notches in the edge of the plate. I prefer to use two sets of partition-plates C C′. One plate C′ has side flanges $c^2$ $c^2$, Fig. 6, cast thereon, and these flanges are turned at right angles to the plate, as shown in Fig. 7. They form the end walls of the chamber for the zinc plate, as described hereinafter. The plate C′ has top and bottom flanges $c^3$ $c^4$ and an end flange $c^5$, which are bent as shown in Fig. 7 and form, as shown in Fig. 8, the top and bottom and one end of the compartment for the chromic acid or other depolarizing agent.

In order to tie the plates together at the center and also to keep the zinc plates out of contact with the partition-plates, I use a stud $C^2$, of non-conducting material. (Shown clearly in Fig. 9.) This stud has a central flange $c^6$, undercut projections $c^7$ at each side, and projecting heads $c^8$. The stud is mounted between the two plates C C′, the projections $c^7$ extending through openings in the plates.

When the plates are assembled with the studs, the lead is forced by a suitable tool under the undercut projection $c^7$, thus binding both plates to the stud and making a liquid-tight joint. The lead in some instances may be heated, so as to flow around the studs. The heads $c^8$ project beyond the surface of the plates and prevent the zinc plates coming in contact with the surface of the partition-plates.

The sets of partition-plates are assembled and secured together by the ordinary process of burning or brazing.

A channel D is formed on one edge of each cell, which communicates with the space $d$ for the depolarizing agent, and this channel has a nozzle $d'$ at the bottom, through which the liquid enters from the reservoir or other source of supply. The channel is formed partly by the end flanges $c^2$ of the plates C and by a sheet of lead $d^2$, suitably brazed to the end plates of the cell.

$d^3$ is a tubular extension at the upper end of the channel D to allow the air to escape when the compartments are being filled.

In the bottom of the cell is a non-conducting cup E, preferably molded in porcelain or glass. This cup has a nozzle $e$ for the passage of fluid into the zinc-compartment $f$. In the present instance this fluid is dilute sulfuric acid. In the cup rests a conducting-plate G, having a terminal $g$, which extends up through one of the compartments $f$, as shown in Fig. 5, and out one end of the cell, passing through a non-conducting sleeve $g'$ in the casing. This plate G, as shown in Fig. 10, is preferably made of copper, as well as the conductor $g$; but both the conductor and plate are covered with a lead sheathing $g^2$, entirely inclosing the copper within the lead. The object of this is to prevent the chromic acid eating away the copper. At the same time I prefer to use the copper plate, as it is a better conductor than lead.

The zinc plates F are mounted in the compartments $f$, and they are kept central between the carbon partitions by the projecting heads of the studs $C^2$, and their edges rest in non-conducting channeled strips $f'$, made in the present instance of porcelain or glass. These strips extend from top to bottom of the battery, so that while the zinc plates are free to be removed they are kept out of contact with the casing and the carbon plates, as it will be understood that the casing and the carbon plates form one terminal of the battery and the zinc plate forms the other terminal.

When the sections of the battery are assembled, a sheet of lead $b'$ is attached to each side of the cell, as shown in Fig. 5, and the lead casing $b^2$, inclosing the cup E, is burned onto the body of the cell, as shown in Fig. 4. I preferably extend the casing above the sections by mounting on the sections a frame $B^2$, preferably of non-conducting material, and extend the lead sheets forming the sides over this frame, as in Figs. 3 and 4.

When the cells are assembled, as shown in Fig. 1, the terminal $g$ of one plate is bent over and burned onto the casing of the adjoining cell, as shown at $g^2$, so that all the cells are coupled together.

At the sides of the battery are channels H and I. The channel H conveys the depolarizing agent to the several chambers D and compartments $d$, while the channel I conveys the sulfuric acid to the compartments $f$. The channel H has a lead casing $h$, bent as shown in Figs. 11 and 12, with a non-conducting lining $h'$. It is essential that the channels at each side of the battery connecting the several elements or cells shall be insulated from one end to the other, on account of the fact that if they are not provided with an insulating-lining throughout the leakage of current between the elements will be very great. If the channels are lined, the current will have to travel the full extent in the liquid. If the channels are not lined, however, the current will pass through the small amount of liquid and then will use the casing forming the channels as a conductor. As an insulating-lining for the channels I prefer to use mica, as I find by experience that this seems to be the lightest and best non-conductor for this purpose and the easiest applied. The channel H is secured to the threaded nipples $d'$ of the cells B' by nuts $h^2$, and between the casing of the channel and the casing of each cell is a non-conducting washer $h^3$. This washer has a flange $h^4$, which insulates the casing from the nipple. The base-flange of each nipple is burned or brazed onto the lead casing of the cell. The channels are made by taking one or more sheets of mica and a sheet of lead, forming holes in them for the nipples, as shown in Fig. 12, and bending them on the lines $x\,x'\,x^2\,x^3$. Then the sheets of lead and mica are placed in position over the nipples and the nuts applied, so as to fasten the backs of the channel securely to the assembled cells. After they are in position the lead and mica are folded down, as shown, and the adjoining sections of the lead burned, forming the channel shown in Fig. 11. I preferably coat the inner surface of the lead casing with a coat of asphalt or other non-conducting paint. The channel I on the opposite side is formed and arranged similar to the channel H, having a casing $i$ and a mica lining $i'$, and is secured to the nipples E in the same manner that the channel H is secured, so that when the liquid is caused to flow into the channels the several compartments are filled to the proper height. A gage-glass $m$ may be used on each channel, as shown in Fig. 2, if desired, so as to indicate the height of the liquid in the battery. The channel H is connected to a reservoir J, containing the chromic acid or other depolarizing agent, by a pipe J', which extends to the lower portion of the reservoir. At this point there is an outlet-valve $J^2$, through which the liquid can be drawn from the batteries and from the reservoir J when desired. $J^3$ is a tube connected to the reservoir through which fresh liquid is supplied.

K is the reservoir for the sulfuric acid. This reservoir is connected by a pipe K' to the channel I and has an outlet-valve $K^2$, and $K^3$ is the tube by which the reservoirs are filled.

I connect the pipes J' and K' by a pipe L, having a valve $l$, preferably of glass. The object of this connection is to drain the cells of the battery should there be a leak. If one reservoir should be full, the surplus could be conveyed to the other reservoir. The small quantity of liquid while affecting the elements in the cells would not to any great degree affect the liquid in the reservoir into which it was directed.

N is a pipe leading either to an air-compressor or to a compressed-air reservoir, and this pipe has a suitable valve $n$. The pipe has two branches N' $N^2$, the branch N' leading to the reservoir J and the branch $N^2$ leading to the reservoir K. The branches have valves $n'$ $n^2$, respectively, as shown in Fig. 2, so that by opening the three valves $n\,n'\,n^2$ the air under pressure will force the liquid from the reservoirs J and K simultaneously into the compartments of the battery. By shutting one or other of the valves $n'$ $n^2$ the liquid can be forced either from the reservoir J or K into the battery when desired.

$g^3$ and $g^4$ are the terminals, to which wires from the system may be coupled.

I claim as my invention—

1. The combination in a battery, of a series of cells separated from another, a nipple on each cell, a channel secured to the nipples, said channel having a casing of lead and a non-conducting lining, substantially as described.

2. The combination of a series of cells, nipples for each cell, a channel attached to all the cells, said channel being formed of a lead casing, with a lining of non-conducting material, a non-conducting washer between the cell-casing and the channel, and a nut on each nipple adapted to confine the channel to the nipple, substantially as described.

3. The combination of a series of cells having nipples, a channel made up of a sheet of lead having a series of holes through which the nipples of the sections pass, and a non-conducting lining, said lead sheet and lining being bent and united so as to form a channel, substantially as described.

4. The combination in a battery, of a cell and a series of porous partition-plates therein forming two sets of compartments, a molded non-conducting cup mounted under the partitions, and grooved non-conducting end pieces mounted in alternate spaces, with zinc plates adapted to the grooved end pieces and a conductor mounted in the non-conducting cup on which the several zinc plates rest, substantially as described.

5. The combination in a two-liquid primary battery, of a series of porous partitions made up of plates of carbons arranged within lead frames, each of said frames having projections entering notches in its plate and having flanges formed integral therewith adapted to be attached to the frame of an adjoining partition, substantially as described.

6. The combination in a battery, of the two sets of partitions, each partition made up of a plate of porous material mounted in a frame, each partition having flanges thereon and bent at right angles to the plate, the flanges of one plate forming the top, bottom, and one side of one compartment, and the flanges on the other plate forming the sides of the adjoining compartment, substantially as described.

7. The combination in a battery, of two porous plates arranged side by side and having openings, a stud having a flange and projections, the projections passing through the openings in the adjoining plates, and heads on each end of the stud extending beyond the plates and forming a non-conducting space for the zinc electrode, substantially as described.

8. The combination of the two adjoining battery-plates having openings, a stud having a central flange adapted to a space between the plates, and undercut projections entering the openings in the plates, the metal of the plates being turned down and burned at the undercut portions of the stud, substantially as described.

9. The combination of a series of battery-cells, channels H and I communicating with the space in the cells, reservoirs J and K, pipes J' and K' forming communication between the reservoirs and cells respectively, and a valved connecting-pipe L forming a communication between the pipes leading from the battery to the reservoirs, substantially as and for the purpose set forth.

10. The combination in a two-liquid primary-battery cell, of a series of partitions made of lead frames containing carbon plates, said frames having integral flanges separating them from the adjoining plates, a cup of non-conducting material at the base of the cell, a compound conducting-plate mounted in said cup, a frame mounted above the body of the cell, a sheet of lead on each side of the cell and covering the frame, and a lead casing for the non-conducting cup secured to the body of the cell, substantially as described.

In testimony whereof I have signed my name to this specification in the presence of two subscribing witnesses.

HENRY K. HESS.

Witnesses:
 WILL. A. BARR,
 JOS. H. KLEIN.